UNITED STATES PATENT OFFICE.

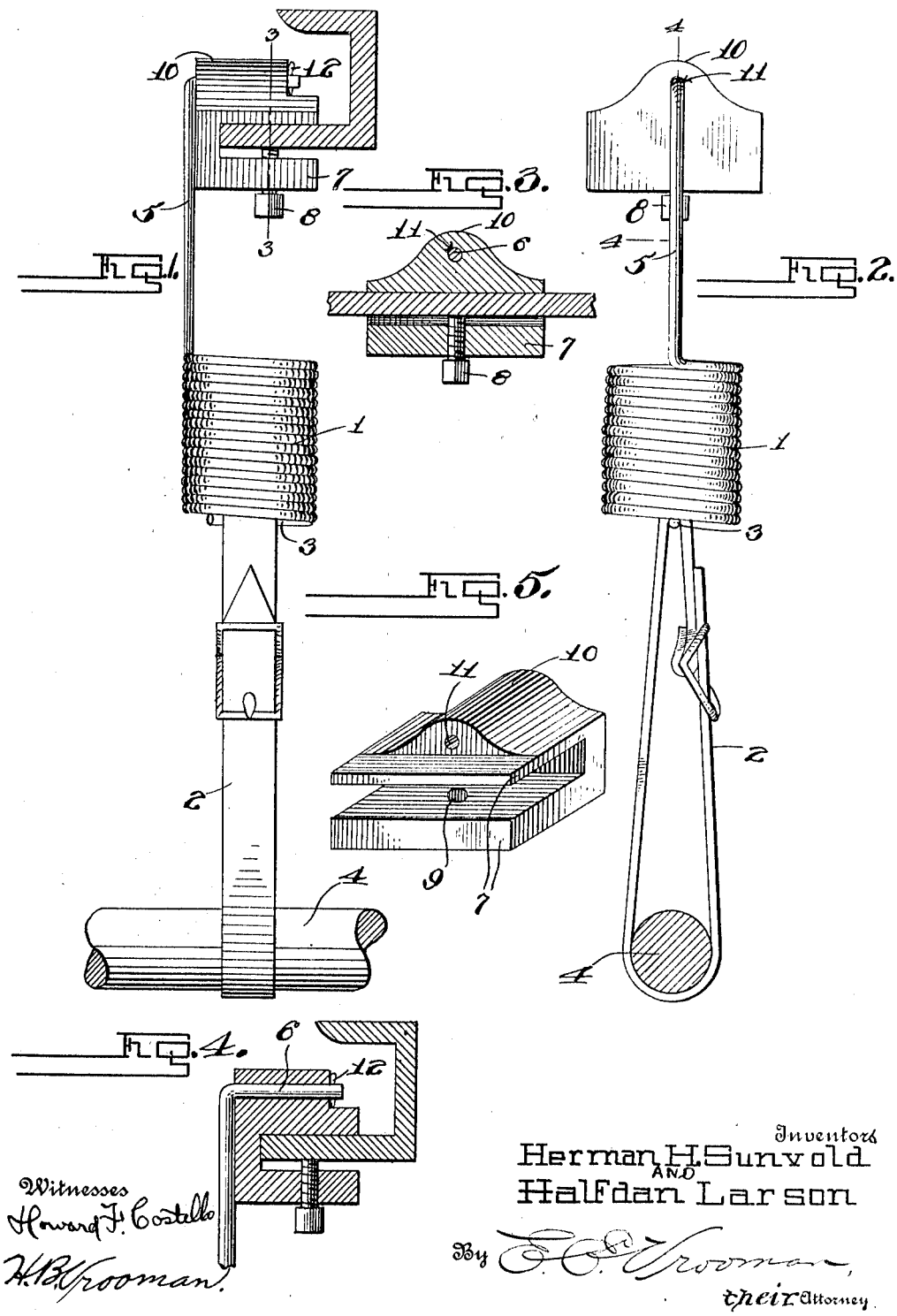

HERMAN H. SUNVOLD AND HALFDAN LARSON, OF SACRED HEART, MINNESOTA.

SHOCK-ABSORBER.

1,061,420.

Specification of Letters Patent. Patented May 13, 1913.

Application filed July 1, 1912. Serial No. 707,030.

*To all whom it may concern:*

Be it known that we, HERMAN H. SUNVOLD and HALFDAN LARSON, citizens of the United States, residing at Sacred Heart, in the county of Renville and State of Minnesota, have invented certain new and useful Improvements in Shock - Absorbers, of which the following is a specification, reference being had therein to the accompanying drawing.

This invention relates to shock absorbers and has special reference to a device which is provided with a spring which is adapted to reduce the rebounding of an automobile, when the same is traveling over an uneven surface.

Another object of the invention is the production of a novel clamp means, which is so formed as to cause the strain of the shock to be carried by the frame of the automobile.

With these and other objects in view this invention consists of certain novel constructions, combinations, and arrangement of parts, as will be hereinafter fully described and claimed.

In the accompanying drawings:—Figure 1 is a side elevation of the device attached to the frame of an automobile. Fig. 2 is a front elevation of the device. Fig. 3 is a section taken on the line 3—3 of Fig. 1. Fig. 4 is a section taken on the line 4—4 of Fig. 2. Fig. 5 is a perspective view of the clamp.

Referring to the accompanying drawings it will be seen that the device consists of a coil spring 1, which supports a strap 2 upon the transversely extending arm 3. The strap 2 is passed around the axle 4 of the automobile and in this manner provides a springing action when the car is being driven over uneven surfaces. The spring 1 is provided with an upwardly extending neck 5 and terminates in a laterally extending arm 6.

A U-shaped clamp member, which is provided with the jaws 7 is carried by the frame of the automobile. This U-shaped clamp is held upon the frame by means of the screw 8, which passes through the aperture 9 formed in the lower jaw, said screw 8 bearing upon the frame of the automobile and holding said frame in engagement with the upper jaw. A journal portion 10 is formed upon the upper jaw, which consists of an enlarged body portion, which tapers down to produce a uniform thickness along the side edges.

The laterally extending arm 6 passes through the aperture 11 formed in the journal 10, and is held therein by means of the pin 12. By referring to Fig. 1, in which the device is attached to the frame of the automobile and axle thereof, it will be seen that the laterally extending arm 6, which is positioned within the aperture 11 formed in the journal 10 of the clamp member, overhangs the frame of the car, whereby the strain occasioned by the car passing over an uneven surface is carried directly to the frame, whereby the danger of breaking or wearing of the clamp member is greatly reduced, since said member receives comparatively little of the strain.

Having thus described the invention, what is claimed as new is:—

In a shock absorber of the class described adapted to straddle the angle iron of an automobile comprising a spring, connecting means carried by the lower end of said spring, said spring provided with an upwardly extending neck terminating in a laterally extending arm, a U-shaped clamp member adapted to be carried by the frame of the automobile, said clamp member provided with means for holding it in engagement with said frame, a journal formed upon the upper side of said clamping member, said journal provided with an enlarged body portion tapering to produce a uniform thickness along the side edges of the clamping member, said body portion of said journal provided with a longitudinally extending aperture, said laterally extending arm of said spring positioned within said aperture formed in said journal so as to overhang said clamping member and relieve the strain from the jaws thereof, means for holding the laterally extending arm therein, whereby when pressure is brought to bear upon the spring the strain will be brought to bear directly upon the frame of the automobile, and in this manner greatly reduce the wear upon the clamping member.

In testimony whereof we hereunto affix our signatures in presence of two witnesses.

HERMAN H. SUNVOLD.
HALFDAN LARSON.

Witnesses:
G. P. MANGERUD,
HANS H. RISTVADT.